United States Patent
Smales et al.

(10) Patent No.: US 11,831,792 B2
(45) Date of Patent: Nov. 28, 2023

(54) MUTUAL AUTHENTICATION OF COMPUTER SYSTEMS OVER AN INSECURE NETWORK

(71) Applicant: FORTICODE LIMITED, Frankston (AU)

(72) Inventors: Antony Smales, Frankston (AU); Mirza Ceyzar, MacLeod (AU)

(73) Assignee: Forticode Limited, Frankston (AU)

( * ) Notice: Subject to any disclaimer, the term of this patent is extended or adjusted under 35 U.S.C. 154(b) by 331 days.

(21) Appl. No.: 17/311,499

(22) PCT Filed: Nov. 26, 2019

(86) PCT No.: PCT/AU2019/051294
§ 371 (c)(1),
(2) Date: Jun. 7, 2021

(87) PCT Pub. No.: WO2020/107065
PCT Pub. Date: Jun. 4, 2020

(65) Prior Publication Data
US 2022/0006657 A1   Jan. 6, 2022

(30) Foreign Application Priority Data
Nov. 26, 2018 (AU) ................................ 2018904493

(51) Int. Cl.
*H04L 9/32* (2006.01)
*H04L 9/30* (2006.01)

(52) U.S. Cl.
CPC .......... *H04L 9/3273* (2013.01); *H04L 9/3073* (2013.01); *H04L 9/3247* (2013.01)

(58) Field of Classification Search
CPC ... H04L 63/08; H04L 63/0869; H04L 63/166; H04L 63/168; H04L 9/3073; H04L 9/3247; H04L 9/3273
See application file for complete search history.

(56) References Cited

U.S. PATENT DOCUMENTS 8,346,223 B1 *  1/2013  Byrnes ................ H04L 41/0816
                                                     455/418
9,209,980 B2 * 12/2015  Bowman ............... H04L 9/0844
(Continued)

FOREIGN PATENT DOCUMENTS

| KR | 10-2008-0093431 | 10/2008 |
| KR | 10-2011-0139414 | 12/2011 |
| WO | 2016/128569 A1 | 2/2016 |

OTHER PUBLICATIONS

International Searching Authority (ISA), Notification of Transmittal of the International Search Report and the Written Opinion of the International Searching Authority, for International Application No. PCT/AU2019/051294, 8 pp., dated Mar. 17, 2020.
(Continued)

*Primary Examiner* — Gary S Gracia
(74) *Attorney, Agent, or Firm* — Ballard Spahr LLP (57) ABSTRACT

Methods and systems are provided for mutual authentication between an agent, such as a user (142), and a service host system (128), such as a service provider system, via an insecure and/or untrusted communications network (140). In exemplary embodiments, an initial enrolment sequence (300, 400) is mediated by an authentication server (102) to establish an association between the service host system (128) having an identifier (SPID), an agent (142) that is assigned an identifier (UID) known to the service provider, and a client device (116) having a device identifier (DevID), which is used to access the service, along with a set of credentials comprising cryptographic signatures generated by the service host system (128) and client device (116) using corresponding private keys. The resulting data and credentials may be disclosed publicly, remain valid so long as the private keys are not compromised, and can be used
(Continued)

Figure 6 subsequently for mutual authentication between the client device (116) and the service host system (128).

15 Claims, 5 Drawing Sheets

(56) References Cited

U.S. PATENT DOCUMENTS

| | | | |
|---|---|---|---|
| 9,699,655 B1* | 7/2017 | Silis | H04L 9/3247 |
| 9,755,834 B1* | 9/2017 | Johnson | H04L 9/3234 |
| 10,037,232 B1* | 7/2018 | Garcia | G06F 9/542 |
| 11,070,532 B1* | 7/2021 | Choi | H04L 9/3236 |
| 11,087,424 B1* | 8/2021 | Sarkar | G06Q 30/0256 |
| 2007/0180499 A1* | 8/2007 | Van Bemmel | H04L 63/0892 |
| | | | 726/4 |
| 2012/0124375 A1* | 5/2012 | Truskovsky | H04L 63/0869 |
| | | | 713/168 |
| 2012/0159167 A1* | 6/2012 | Lee | H04W 12/069 |
| | | | 713/168 |
| 2014/0351912 A1* | 11/2014 | Fu | H04L 63/0876 |
| | | | 726/7 |
| 2015/0131874 A1* | 5/2015 | Mettyear | G06V 30/1423 |
| | | | 382/122 |
| 2016/0337321 A1* | 11/2016 | Lin | H04L 9/3263 |
| 2017/0111323 A1* | 4/2017 | Borkar | H04L 9/321 |
| 2017/0134444 A1* | 5/2017 | Buckley | H04L 9/3271 |
| 2017/0142087 A1* | 5/2017 | Maninder | H04L 9/3297 |
| 2018/0198625 A1* | 7/2018 | Tseng | H04L 63/0428 |
| 2018/0219743 A1* | 8/2018 | Garcia | H04L 41/0213 |
| 2018/0254898 A1* | 9/2018 | Sprague | H04L 9/006 |
| 2018/0322103 A1* | 11/2018 | Yeo | G06V 40/1365 |
| 2019/0158283 A1* | 5/2019 | Kang | H04L 9/3242 |
| 2020/0082153 A1* | 3/2020 | Holden | G06V 30/1423 |
| 2020/0127828 A1* | 4/2020 | Liu | H04L 9/0637 |
| 2020/0382927 A1* | 12/2020 | Leduc | H04W 8/20 |
| 2022/0006657 A1* | 1/2022 | Smales | H04L 63/08 |
| 2023/0161768 A1* | 5/2023 | Frampton | H04L 63/1441 |
| | | | 726/23 |

OTHER PUBLICATIONS

Kilani et al., "Mobile Authentication with NFC Enabled Smartphones," 2012, http://eng.au.dk/fileadmin/DJF/ENG/PDF-filer/Tekniske_rapporter/samlet-ECE-TC-14.pdf, XP0551323692.

* cited by examiner

MUTUAL AUTHENTICATION OF COMPUTER SYSTEMS OVER AN INSECURE NETWORK

CROSS REFERENCE TO RELATED APPLICATIONS

This Application is a national stage filing under 35 U.S.C. § 371 of International Application No. PCT/AU2019/051294, filed on Nov. 26, 2019, which claims priority to Australian Patent Application No. 2018904493, filed Nov. 26, 2018, herein incorporated by reference in their entireties.

FIELD OF THE INVENTION

The present invention relates to cryptographic authentication of computer systems over insecure or untrusted networks. More particularly, embodiments of the invention provide for mutual authentication between user devices and service provider systems.

CROSS-REFERENCE TO RELATED APPLICATIONS

The present application claims the benefit of priority from Australian provisional application no. 2018904493, which is incorporated herein by reference in its entirety.

BACKGROUND TO THE INVENTION

Traditional authentication is a one-sided transaction usually driven by service providers. An end-user is typically willing to trust a service provider, such as an established financial institution, based on brand or reputation, whereas the service provider may require the end-user to disclose significant personal information as proof-of-identity before issuing credentials including a shared secret (e.g. a user ID and password) for use in future transactions. The service provider retains ongoing responsibility for maintaining the privacy of the user information, which may be required for future verification, while the end-user must ensure the security of the shared secret.

When the user subsequently accesses a service of the service provider via a public network such as the internet, they will be asked to enter their credentials, e.g. the user ID and password, which are sent to the service provider for validation. While the credentials are typically encrypted, e.g. using the secure hypertext transfer protocol (HTTPS) with secure socket layer (SSL) or transport layer security (TLS), to protect against eavesdropping attacks, a number of known vulnerabilities exist in the insecure environment of the internet.

For example, in so-called 'phishing' or 'spear-phishing' attacks, a user may be tricked, e.g. via an official-looking email, into accessing a fraudulent website that has a similar appearance to that of the genuine service provider and thus into revealing their credentials to the operator of the fraudulent site. More sophisticated techniques, such as 'man-in-the-middle' attacks based on domain name system (DNS) spoofing and/or the infiltration of malware into a user device or equipment within the network itself, enable user credentials to be appropriated even from more sophisticated users who may be less easily fooled by a phishing attack.

Many known avenues of attack are effective primarily due to the one-sided nature of traditional authentication. Much of the onus for maintaining the secrecy of access credentials lies with users, even though users and user devices represent relatively soft targets for attackers, when compared with the sophisticated secure systems maintained by service providers. Accordingly, such avenues could be substantially closed to attackers by requiring mutual authentication, in which the user not only provides credentials to the service provider system, but the service provider system is also required to provide credentials to the user device as proof of its own authenticity. Furthermore, a practicable mutual authentication system should impose minimal requirements on users to protect secret information, and should be as transparent and seamless as possible from a user perspective.

Embodiments of the present invention are therefore directed to providing for mutual authentication between user devices and service provider systems, having these desirable characteristics.

SUMMARY OF THE INVENTION

In one aspect, the invention provides a cryptographic method for providing mutual authentication between an agent associated with a client device and a service host system, wherein the agent is assigned an agent identifier, the client device is assigned a device identifier, the service host is assigned a service host identifier, the client device has an associated public/private key pair ($K_{dev}$, $K^{-1}_{dev}$), and the service host system has an associated public/private key pair ($K_{SP}$, $K^{-1}_{SP}$), and wherein the method comprises:

receiving, from the client device, a first cryptographic signature of a concatenation of the agent identifier, the device identifier, the service host identifier, and the service host system public key ($K_{SP}$);

verifying, using the client device public key ($K_{dev}$) that the first cryptographic signature was generated using the client device private key ($K^{-1}_{dev}$);

receiving, from the client device, one or more agent public keys ($\{K_{u,i}\}$) generated at the client device and each having a corresponding agent private key ($\{K^{-1}_{u,i}\}$);

transmitting, to the service host system, the one or more agent public keys ($\{K_{u,i}\}$);

receiving, from the service host system, for each of the one or more agent public keys, a corresponding subsequent cryptographic signature of a concatenation of the agent identifier, the device identifier, the service host identifier, and the associated agent public key ($K_{u,i}$); and verifying, using the service host system public key ($K_{SP}$) that each subsequent cryptographic signature was generated using the service host system private key ($K^{-1}_{SP}$), whereby the first cryptographic signature and the one or more subsequent cryptographic signatures comprise public credentials for mutual authentication between the agent and the service host system.

Advantageously, the credentials generated in accordance with embodiments of the invention enable ongoing mutual authentication between the client device and the service host system, and remain valid for as long as the private keys are not compromised. The credentials themselves do not require secure storage, and can be maintained in a repository for ease of subsequent retrieval by the client device and/or the service host system, and/or may be published and transmitted openly via any convenient network or communication channel. Furthermore, software components implementing the required client device functionality may be incorporated into a downloadable app, which may employ a keystore service provided by the device system software and/or hardware, to ensure security of the device and agent private keys. Details of authentication sequences embodying the invention may thereby remain transparent to the agent. For example, a human user may be required only to provide local authentication to the app (e.g. via a password, challenge/response, and/or biometric identification such as a fingerprint) to enable it to access the keystore service and initiate authentication.

In embodiments of the invention, the agent comprises a human user, the client device comprises a user device, and the service host system comprises a system operated by a service provider. Advantageously, the user device may be a portable device such as a smartphone or tablet, which a user is able to carry with them to provide convenient access to authentication and the services of the service provider. In this way, the user device becomes a factor in a multi-factor authentication process, i.e. possession of the device serves as a requirement for access to the services of the service provider.

In embodiments of the invention, the one or more agent public keys may comprise a plurality of agent public keys, each of which is associated with a corresponding authorisation level.

The method may further comprise authentication of the service host system at the client device using the first cryptographic signature by steps comprising:

verifying, by the client device using the using the client device private key ($K^{-1}_{dev}$), that the first cryptographic signature corresponds with the agent identifier, the device identifier, the service host identifier, and the service host system public key ($K_{SP}$), generating, by the client device, a first challenge requiring solution by the service host system using the service host system private key ($K^{-1}_{SP}$);

transmitting, by the client device to the service host system, a message comprising the first challenge;

generating, by the service host system using the service host system private key ($K^{-1}_{SP}$), a response to the first challenge;

transmitting, by the service host system to the client device, a message comprising the response to the first challenge; and verifying, by the client device using the service host system public key ($K_{SP}$), that the response to the first challenge was generated using the service host system private key ($K^{-1}_{SP}$).

Conversely, the method may further comprise authentication of the agent at the service host system using a selected one of the subsequent cryptographic signatures by steps comprising:

verifying, by the service host system using the service host system private key ($K^{-1}_{SP}$), that the selected cryptographic signature corresponds with the agent identifier, the device identifier, the service host identifier, and the agent public key ($K_{u,i}$) associated with the selected cryptographic signature, generating, by the service host system, a second challenge requiring solution by the client device using the associated agent private key ($K^{-1}_{u,i}$);

transmitting, by the service host system to the client device, a message comprising the second challenge;

generating, by the client device using the associated agent private key ($K^{-1}_{u,i}$), a response to the second challenge;

transmitting, by the client device to the service host system, a message comprising the response to the second challenge; and verifying, by the service host system using the corresponding agent public key ($K_{u,i}$), that the response to the second challenge was generated using the associated agent private key ($K^{-1}_{u,i}$).

Advantageously, if any component of the signatures, or the signed content, has been altered or falsified, the foregoing mutual authentication sequences will fail at one, or both, of the client device or service host system. Otherwise, each party is assured that it is in possession of the other party's relevant public key(s). The subsequent exchange of challenges further provides mutual assurance that both parties have successfully verified their respective signatures, and that each is the original authentic entity responsible for generating the signatures.

In embodiments of the invention, the method further comprises initial enrolment of the agent to access one or more services of the service host system by steps comprising:

receiving, from the service host system, the agent identifier;

generating a session-specific identifier suitable for communication by the service host system to the client device;

transmitting, to the service host system, the session-specific identifier;

receiving, from the client device, the session-specific identifier and the device identifier;

transmitting, to the client device, the service host public key ($K_{SP}$);

transmitting, to the service host system, the client device public key ($K_{dev}$);

receiving, from the client device, a message comprising a service host challenge requiring solution by the service host system using the service host system private key ($K^{-1}_{SP}$);

transmitting, to the service host system, a message comprising the service host challenge;

receiving, from the service host system, a message comprising a response to the service host challenge;

transmitting, to the client device, a message comprising the response to the service host challenge, whereby the client device is able to verify the response to the service host challenge using the service host public key ($K_{SP}$);

receiving, from the service host system, a message comprising a client device challenge requiring solution by the client device using the client device private key ($K^{-1}_{dev}$);

transmitting, to the client device, a message comprising the client device challenge;

receiving, from the client device, a message comprising a response to the client device challenge; and transmitting, to the service host system, a message comprising the response to the client device challenge, whereby the service host system is able to verify the response to the client device challenge using the client device public key ($K_{dev}$).

Advantageously, an enrolment process embodying the invention enables a mediating system, such as an authentication server implementing the above method, to create an association between an agent, a client device and a service host system, and establish a trusted communications environment within which mutual authentication credentials (i.e. the cryptographic signatures) may be generated.

In another aspect, the invention provides an authorisation server configured to provide for mutual authentication between an agent associated with a client device and a service host system, wherein the agent is assigned an agent identifier, the client device is assigned a device identifier, the service host is assigned a service host identifier, the client device has an associated public/private key pair ($K_{dev}$, $K^{-1}_{dev}$), and the service host system has an associated public/private key pair ($K_{SP}$, $K^{-1}_{SP}$), the authorisation server comprising:

a processor;
at least one memory device accessible by the processor; and
a network interface accessible by the processor,
wherein the memory device contains a body of program instructions which, when executed by the processor, cause the authorisation server to implement a method comprising:
receiving, from the client device via the network interface, a first cryptographic signature of a concatenation of the agent identifier, the device identifier, the service host identifier, and the service host system public key ($K_{SP}$);
verifying, using the client device public key ($K_{dev}$) that the first cryptographic signature was generated using the client device private key ($K^{-1}_{dev}$);
receiving, from the client device via the network interface, one or more agent public keys ($\{K_{u,i}\}$) generated at the client device and each having a corresponding agent private key ($\{K^{-1}_{u,i}\}$);
transmitting, to the service host system via the network interface, the one or more agent public keys ($\{K_{u,i}\}$);
receiving, from the service host system via the network interface, for each of the one or more agent public keys, a corresponding subsequent cryptographic signature of a concatenation of the agent identifier, the device identifier, the service host identifier, and the associated agent public key ($K_{u,i}$); and
verifying, using the service host system public key ($K_{SP}$) that each subsequent cryptographic signature was generated using the service host system private key ($K^{-1}_{SP}$),
whereby the first cryptographic signature and the one or more subsequent cryptographic signatures comprise public credentials for mutual authentication between the agent and the service host system.

In another aspect, the invention provides a computer program product for use in providing mutual authentication between an agent associated with a client device and a service host system, wherein the agent is assigned an agent identifier, the client device is assigned a device identifier, the service host is assigned a service host identifier, the client device has an associated public/private key pair ($K_{dev}$, $K^{-1}_{dev}$), and the service host system has an associated public/private key pair ($K_{SP}$, $K^{-1}_{SP}$), the product comprising a tangible computer-readable medium having instructions stored thereon which, when executed by a processor of the client device, implement a method comprising:
generating, using the client device private key ($K^{-1}_{dev}$), a cryptographic signature of a concatenation of the agent identifier, the device identifier, the service host identifier, and the service host system public key ($K_{SP}$);
transmitting, to an authorisation server, the cryptographic signature whereby the authorisation server is able to verify, using the client device public key ($K_{dev}$) that the cryptographic signature was generated using the client device private key ($K^{-1}_{dev}$);
generating one or more agent public/private key pairs ($\{K_{u,i}, K^{-1}_{u,i}\}$); and
transmitting, to the authorisation server, the agent public keys ($\{K_{u,i}\}$).

In yet another aspect, the invention provides a service host system configured to provide for mutual authentication between an agent associated with a client device and the service host system, wherein the agent is assigned an agent identifier, the client device is assigned a device identifier, the service host is assigned a service host identifier, the client device has an associated public/private key pair ($K_{dev}$, $K^{-1}_{dev}$), and the service host system has an associated public/private key pair ($K_{SP}$, $K^{-1}_{SP}$), the service host system comprising:
a processor;
at least one memory device accessible by the processor; and
a network interface accessible by the processor,
wherein the memory device contains a body of program instructions which, when executed by the processor, cause the service host system to implement a method comprising:
receiving, from an authorisation server via the network interface, one or more agent public keys ($\{K_{u,i}\}$) generated at the client device and each having a corresponding agent private key ($\{K^{-1}_{u,i}\}$);
generating, for each of the one or more agent public keys, a corresponding cryptographic signature of a concatenation of the agent identifier, the device identifier, the service host identifier, and the associated agent public key ($K_{u,i}$); and
transmitting, to the authorisation server via the network interface, the cryptographic signatures, whereby the authorisation server is able to verify, using the service host system public key ($K_{SP}$), that each cryptographic signature was generated using the service host system private key ($K^{-1}_{SP}$).

Further aspects, advantages, and features of embodiments of the invention will be apparent to persons skilled in the relevant arts from the following description of various embodiments. It will be appreciated, however, that the invention is not limited to the embodiments described, which are provided in order to illustrate the principles of the invention as defined in the foregoing statements and in the appended claims, and to assist skilled persons in putting these principles into practical effect.

BRIEF DESCRIPTION OF THE DRAWINGS

Embodiments of the invention will now be described with reference to the accompanying drawings, in which like reference numerals refer to like features, and wherein.

DETAILED DESCRIPTION OF EMBODIMENTS

Figure 1:
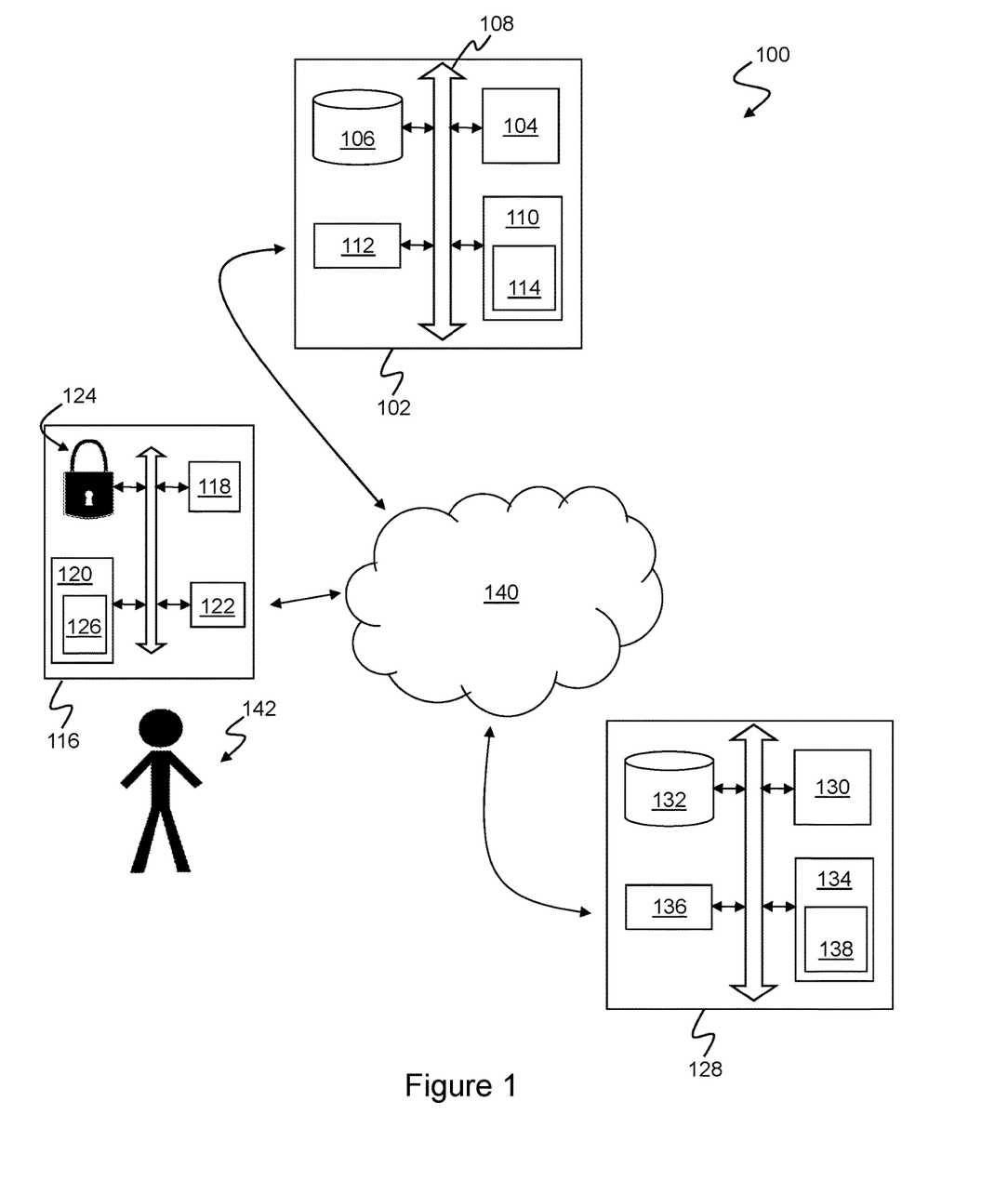
FIG. 1 is a block diagram illustrating an exemplary networked system including an authentication server 102 embodying the invention.

FIG. 1 is a block diagram illustrating an exemplary networked system 100 including an authentication server 102 embodying the invention. In particular, the authentication server 102 comprises a computer-implemented system which is configured to support and mediate mutual authentication between a user and a service provider via an insecure and/or untrusted communications network.

The authentication server 102 may comprise a computer system having a conventional architecture. In particular, the authentication server 102, as illustrated, comprises a processor 104. The processor 104 is operably associated with a non-volatile memory/storage device 106, e.g. via one or more data/address busses 108 as shown. The non-volatile storage 106 may be a hard disk drive, and/or may include a solid-state non-volatile memory, such as ROM, flash memory, solid-state drive (SSD), or the like. The processor 104 is also interfaced to volatile storage 110, such as RAM, which contains program instructions and transient data relating to the operation of the authentication server 102.

In a conventional configuration, the storage device 106 maintains known program and data content relevant to the normal operation of the authentication server 102. For example, the storage device 106 may contain operating system programs and data, as well as other executable application software necessary for the intended functions of the authentication server 102. The storage device 106 also contains program instructions which, when executed by the processor 104, cause the authentication server 102 to perform operations relating to an embodiment of the present invention, such as are described in greater detail below, and with reference to FIGS. 2-6, in particular. In operation, instructions and data held on the storage device 106 are transferred to volatile memory 110 for execution on demand.

The processor 104 is also operably associated with a communications interface 112 in a conventional manner.

In use, the volatile storage 110 contains a corresponding body 114 of program instructions transferred from the storage device 106 and configured to perform processing and other operations embodying features of the present invention. The program instructions 114 comprise a technical contribution to the art developed and configured specifically to implement an embodiment of the invention, over and above well-understood, routine, and conventional activity in the art of computer security and authentication, as further described below, particularly with reference to FIGS. 2-6.

The system 100 also includes a client device 116 that is configured, e.g. via installed software, as discussed further below, to access services provided by a remote service host. In general, the client device may be any suitable data processing system. Without limitation, however, In the embodiments described herein the client device 116 is exemplified by a user device comprising a personal computing device. Advantageously, the user device 116 is a portable device such as a smartphone or tablet, which a user is able to carry with them to provide convenient access to authentication and other services. The user device 116 comprises at least a processor 118, a volatile and/or non-volatile memory store 120 that is accessible to the processor 118, and a network interface 122, which may be a wireless interface, such as a Wi-Fi and/or cellular data interface. In this exemplary embodiment, the user device 116 also comprises a secure keystore component 124, which is a system software and/or hardware module that provides secure key generation, storage, and computation services to application software executing on the device 116.

In use, the memory store 120 contains a body 126 of program instructions configured to perform processing and other operations embodying features of the present invention. In particular, the body 126 of program instructions may comprise an app that is downloadable and installable on the device 116 by a user in order to implement components of an embodiment of the invention required to be executed by the user device 116. Such an app comprises a technical contribution to the art developed and configured specifically to implement an embodiment of the invention, over and above well-understood, routine, and conventional activity in the art of computer security and authentication, as further described below, particularly with reference to FIGS. 2-6.

The networked system 100 further includes a service host system 128 that is configured, e.g. via installed software, to provide one or more services to remote client application executing on client devices, e.g. 116. Without limitation, however, in embodiments described herein the service host system comprises a system operated by a service provider, such as a financial institution or other provider of online services accessible to end users requiring secure authentication for access. The service provider system 128 may comprise a computer system having a conventional architecture similar to that of the authentication server 102. In particular, the service provider system 128, as illustrated, comprises a processor 130 which is operably associated with a non-volatile memory/storage device 132. The processor 130 is also interfaced to volatile storage 134 containing program instructions and transient data relating to the operation of the service provider system 128.

In a conventional configuration, the storage device 132 maintains known program and data content relevant to the normal operation of the service provider system 128. For example, the storage device 132 may contain operating system programs and data, as well as other executable application software necessary for the intended functions of the service provider system 128. These functions may include services provided by the server 128, e.g. online banking functionality, in the exemplary case that the server 128 is operated by an established financial institution.

The storage device 132 also contains program instructions which, when executed by the processor 130, cause the service provider system 128 to perform operations relating to an embodiment of the present invention, such as are described in greater detail below, and with reference to FIGS. 2-6, in particular. In operation, instructions and data held on the storage device 132 are transferred to volatile memory 134 for execution on demand.

The processor 130 is also operably associated with a communications interface 136 in a conventional manner.

In use, the volatile storage 132 contains a corresponding body 138 of program instructions transferred from the storage device 132 and configured to perform processing and other operations embodying features of the present invention. The program instructions 138 comprise a technical contribution to the art developed and configured specifically to implement an embodiment of the invention, over and above well-understood, routine, and conventional activity in the art of computer security and authentication, as further described below, particularly with reference to FIGS. 2-6.

The communications interfaces 112, 122, 136 facilitate communication between the authentication server 102, the user device 116, and the service provider system 128 via a wide-area data communications network, such as the internet 140, which is assumed to be insecure and/or untrusted. Also shown in FIG. 1, by way of example, is an agent comprising a human user 142 of the user device 116. It should be appreciated, however, that the invention is not limited to authentication of human agents, such as the user 142, and may be employed for authentication of non-human agents, such as client software applications operating with a machine-to-machine (M2M) system or environment.

With regard to the preceding overview of the authentication server 102, the service provider system 128, the user device 116, and other processing systems and devices described in this specification, terms such as 'processor', 'computer', and so forth, unless otherwise required by the context, should be understood as referring to a range of possible implementations of devices, apparatus and systems comprising a combination of hardware and software. This includes single-processor and multi-processor devices and apparatus, including portable devices, desktop computers, and various types of server systems, including cooperating hardware and software platforms that may be co-located or distributed. Physical processors may include general purpose CPUs and/or other hardware devices suitable for efficient execution of required programs and algorithms.

Computing systems may include conventional personal computer architectures, or other general-purpose hardware platforms. Software may include open-source and/or commercially available operating system software in combination with various application and service programs. Alternatively, computing or processing platforms may comprise custom hardware and/or software architectures. For enhanced scalability, computing and processing systems, such as the authentication server 102 and service provider system 128, may comprise cloud computing platforms, enabling physical hardware resources to be allocated dynamically in response to service demands. While all of these variations fall within the scope of the present invention, for ease of explanation and understanding the exemplary embodiments are described herein with illustrative reference to single-processor general-purpose computing platforms, commonly available operating system platforms, and/or widely available consumer products, such as desktop PCs, notebook or laptop PCs, smartphones, tablet computers, and so forth.

In particular, the terms 'processing unit' and 'module' are used in this specification to refer to any suitable combination of hardware and software configured to perform a particular defined task. Such a processing unit or module may comprise executable code executing at a single location on a single processing device, or may comprise cooperating executable code modules executing in multiple locations and/or on multiple processing devices.

Software components, e.g. program instructions 114, 126, 138, embodying features of the invention may be developed using any suitable programming language, development environment, or combinations of languages and development environments, as will be familiar to persons skilled in the art of software engineering. For example, suitable software for execution on server systems 102, 128 may be developed using the C programming language, the Java programming language, the C# programming language, the Go programming language, the Python programming language, the JavaScript programming language (e.g. using the Node.js environment), the SQL query language, and/or other languages suitable for implementation of applications, including web-based applications, comprising authentication, cryptographic computation, network communications, service provision, data storage and retrieval, and other algorithms. Similarly, suitable software for execution on user devices, e.g. 116, may be developed using the aforementioned languages, among others. In the case of Android-based devices, however, preferred languages may include Java and Kotlin, while for iOS-based devices preferred languages may include Objective-C and Swift.

It will be appreciated by skilled persons, however, that embodiments of the invention involve the implementation of novel software structures and code that are not well-understood, routine, or conventional in the art of computer security and authentication, and that while pre-existing languages, frameworks, platforms, development environments, and code libraries may assist implementation, they require specific configuration and extensive augmentation (i.e. additional code development) in order to realize various benefits and advantages of the invention. In particular, these tools must be employed by skilled persons to develop program code implementing the specific structures, processing, computations, and algorithms embodying the invention as described below, particularly with reference to FIGS. 2-6.

The foregoing examples of languages, environments, and code libraries are not intended to be limiting, and it will be appreciated that any convenient languages, libraries, and development systems may be employed, in accordance with system requirements. The descriptions, block diagrams, flowcharts, tables, and so forth, presented in this specification are provided, by way of example, to enable those skilled in the arts of software engineering, computer security, cryptography, and network communications to understand and appreciate the features, nature, and scope of the invention, and to put one or more embodiments of the invention into effect by implementation of suitable software code using any suitable languages, frameworks, libraries and development systems in accordance with this disclosure without exercise of additional inventive ingenuity.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media may include volatile and non-volatile, and removable and non-removable, tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. While a computer readable storage medium may not comprise transitory signals per se (e.g. radio waves or other propagating electromagnetic waves, electromagnetic waves propagating through a transmission media such as a waveguide, or electrical signals transmitted through a wire), computer readable program instructions may be downloaded via such transitory signals to a computer, another type of programmable data processing apparatus, or another device from a computer readable storage medium or to an external computer or external storage device via a network. In particular, program instructions for execution on a user device, e.g. 116, may comprise one or more apps downloadable from a central repository or digital distribution platform, such as Google™ Play™ (for Android apps) or the Apple™ App Store™ (for iOS apps).

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence diagrams, and/or block diagrams and described below, particularly with reference to FIGS. 2-6. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flowcharts, sequence diagrams, and/or block diagrams and described below, particularly with reference to FIGS. 2-6.

Figure 2:
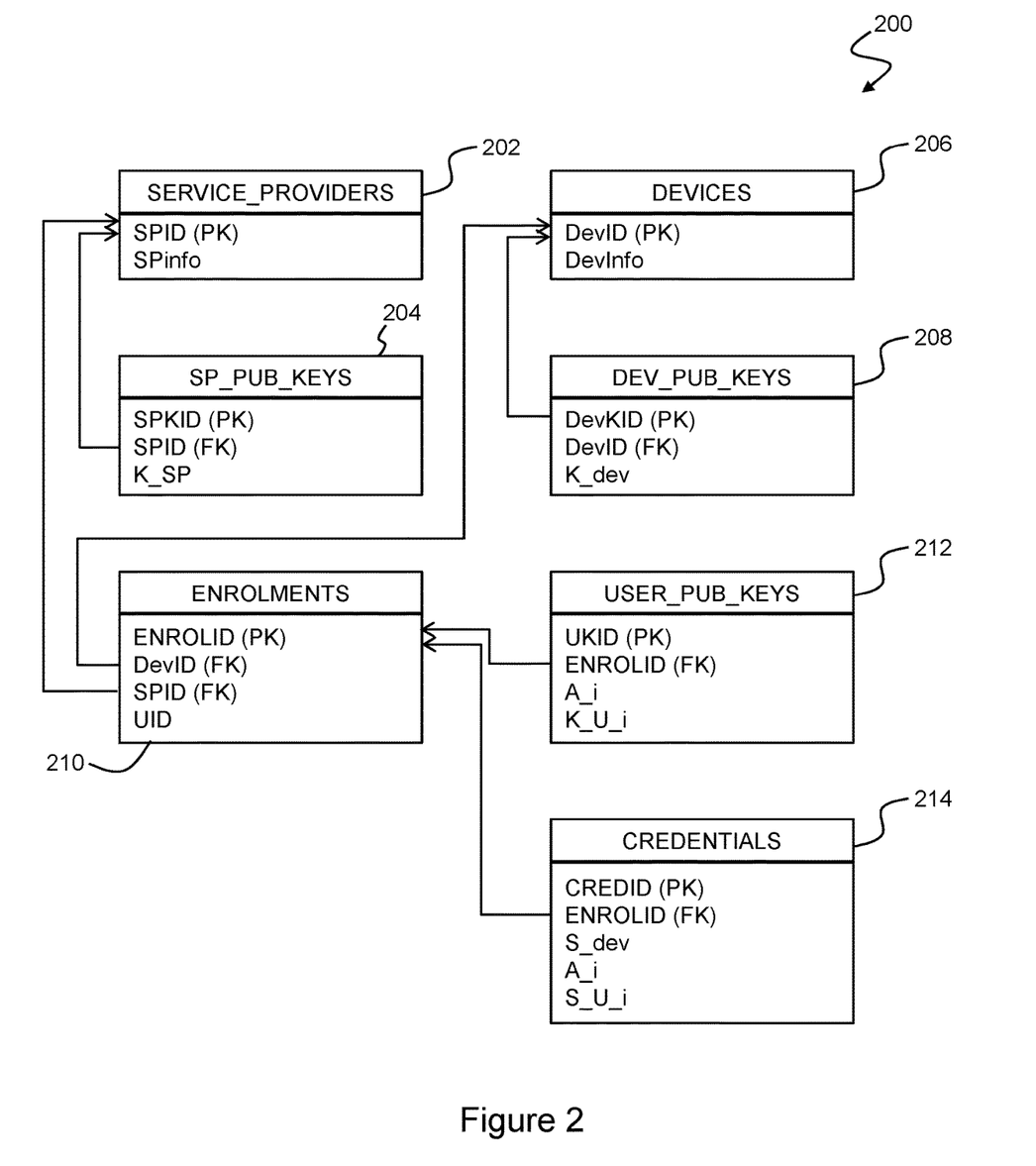
FIG. 2 shows a relational schema of an exemplary database maintained by an authorisation server embodying the invention.

FIG. 2 shows a relational schema 200 of an exemplary database maintained by an authorisation server 102 embodying the invention. The database represented by the schema 200 contains details of service providers, devices, users, and credentials enabling mutual authorisation between user devices and service provider systems. To make use of authorisation services, service providers and user devices must be registered with the authorisation server 102. Initial registration may be implemented using any suitable procedures and protocols, details of which are not relevant to implementations of the present invention and thus beyond the scope of the present disclosure. In general, however, registration of a service provider includes allocation of a service provider identifier (SPID) by the authorisation server 102, generation of a service provider public/private key pair ($K_{SP}$, $K^{-1}_{SP}$) by the service provider system 128, and communication of the service provider public key ($K_{SP}$) to the authorisation server. The SPID is stored in a service providers table 202, along with any relevant service provider information (SPinfo) maintained by the authorisation server, while the service provider public key is stored in a SP public key table 204 in association with the SPID. Similarly, registration of a user device 116 includes allocation of a device identifier (DevID) by the authorisation server 102, generation of a device public/private key pair ($K_{dev}$, $K^{-1}_{dev}$) by the user device 116, and communication of the device public key ($K_{dev}$) to the authorisation server. The DevID is stored in a devices table 206, along with any device information (DevInfo) maintained by the authorisation server, while the device public key is stored in a device public key table 208 in association with the DevID.

Enrolment of a user having a registered user device 116 with a service provider operating a server 128, which is described in detail below with reference to FIG. 3, results in population of three further tables 210, 212, 214. An enrolments table 210 holds associations between a user having a user identifier (UID) that is assigned by, or in cooperation with, the service provider system 128, and the corresponding SPID and DevID. In the course of enrolment, the user device 116 generates at least one user public/private key pair. In embodiments of the invention, M user public/private key pairs ($\{K_{u,i}, K^{-1}_{u,i}\}_{i=1 \ldots M}$) are generated, each of which is associated with a corresponding authorisation level $A_i$. While details of the subsequent use of such authorisation levels are not relevant to implementations of the present invention and thus beyond the scope of the present disclosure, in general the provision of different levels and corresponding key pairs enables the service provider system 128 to control access to services requiring corresponding different levels of user authorisation. It will be appreciated that if a service does not require this feature, a single user public/private key pair may be generated, i.e. the invention encompasses embodiments in which M=1. The resulting user public keys ($\{K_{u,i}\}_{i=1 \ldots M}$) are stored, along with corresponding authorisation levels, in a user public keys table 212. A credentials table 214 holds the authentication credentials generated in the course of enrolment, as described in detail below with reference to FIG. 4.

It should be understood, therefore, that embodiments of the invention are principally concerned with processes resulting in the generation of the contents of the enrolments table 210, the user public key table 212, and most particularly the credentials table 214. As described in detail below with reference to FIGS. 5 and 6, this information is used to generate trust credentials that may be used for subsequent mutual authentication between a user having a user device 116, and a service provider system 128. Significantly, although the information in the database 200 may be optionally stored securely by the authentication server 102, this is not essential. All of the information may be published and/or communicated openly without compromising the integrity of the subsequent authentication process as described below with reference to FIG. 6. The only requirement for ongoing integrity and security is that the user device 116 and the service provider system 128 maintain the secrecy of their respective private keys ($K^{-1}_{dev}$, $\{K^{-1}_{u,i}\}_{i=1 \ldots M}$, $K^{-1}_{SP}$).

Figure 3:
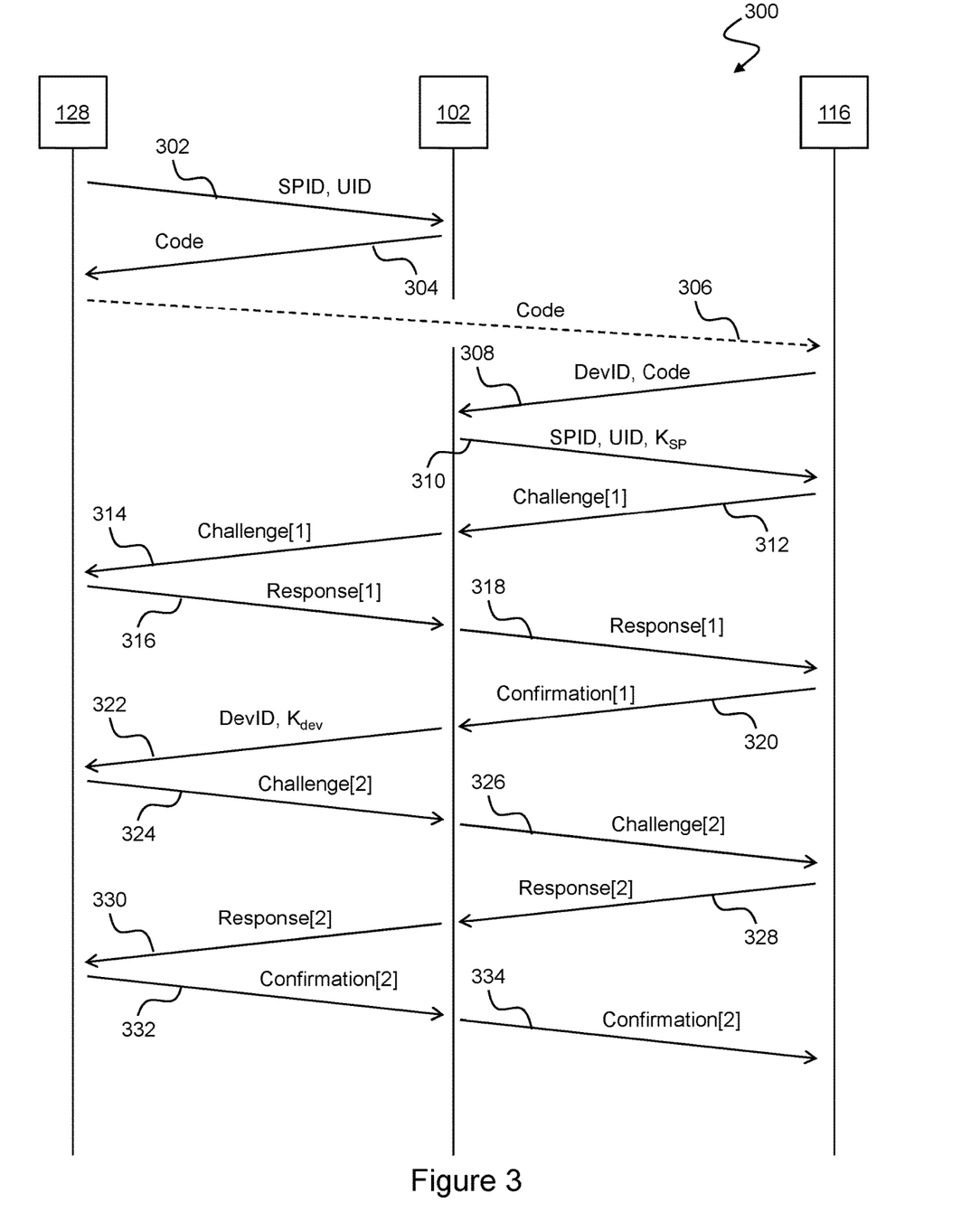
FIG. 3 is a sequence diagram illustrating a first phase of an enrolment process embodying the invention.

FIG. 3 is a sequence diagram 300 illustrating a first phase of an enrolment process embodying the invention. The context in which this process takes place is that of a user 142 having a user device 116 (D) wishes to enroll for a service provided via a service provider system 128 (SP). It is assumed that the user and service provider are in independent contact with one another (e.g. the user may be on-site at a service provider premises, or in communication via a separate channel, such as a telephone connection) and are able to share information in a trusted and secure manner. Additionally, it is assumed that SP 128 and D 116 are each able to establish a trusted and secure communications channel with the authentication server 102 (AS). It should be noted, however, that even if a bad actor were able to interpose a fraudulent authentication server into the enrolment process, this would not result in leakage of any secure information, or enable subsequent access to the service provider system 128 by any device other than the user device 116. Immunity to imitation of AS 102 is an advantageous feature of embodiments of the invention. Notwithstanding this feature, in embodiments of the invention communications between SP 128, D 116, and AS 102 are preferably encrypted (e.g. via SSP/TLS), and transmissions from SP 128 and D 116 may additionally be signed using the respective private keys ($K^{-1}_{SP}$, $K^{-1}_{dev}$) to enable verification of the source by AS 102.

A user identifier (UID) is generated and transmitted 302, along with the SPID of SP 128, by SP 128 to AS 102. The UID may take any form determined by the SP 128, and may be generated by the SP 128 independently, or in coordination with the user 142, e.g. the user 142 may be permitted to select their own user name as a UID, subject to satisfying any formatting and/or uniqueness constraints imposed by the SP 128. (Note that the SPID may be explicitly transmitted, or may be implicit in the process of SP 128 establishing a connection with AS 102.)

Upon receiving the UID, AS 102 is able to populate the corresponding SPID and UID fields of the enrolments table 210, and responds by generating and transmitting 304 a one-time code to the SP 128. The code may take any suitable form, e.g. it may simply be a human-readable alphanumeric or numeric code, or it may be a machine-readable code, such as a bar code or QR code. The code is then transmitted 306 by SP 128 to D 116 via the independent communication channel, which may involve sending the code via telephone or SMS, or presenting the code on a display from which it can be read by the user 142 or scanned using the device D 116.

The device D 116 then transmits 306 the code, along with its own DevID (which may be explicitly transmitted, or may be implicit in the process of D 116 establishing a connection with AS 102) to AS 102, which is thereby able to match the received code to the SPID and UID received in the initial transmission 302 and populate the corresponding DevID field of the enrolments table 210. AS 102 then transmits 310 the UID, SPID, and SP 128 public key ($K_{SP}$) to D 116, thus completing the information about SP 128 held by D 116.

Note that at this point both SP 128 and D 116 trust AS 102, however mutual trust has not yet been established between SP 128 and D 116. It is the role of AS 102 to mediate the establishment of mutual trust. Accordingly, a subsequent sequence of transmissions 312, 314, 316, 318 comprise a challenge and response whereby D 116 confirms that the other party to the enrolment process is actually SP 128. Specifically, the challenge is transmitted 312 from D 116 to AS 102, and then transmitted 314 from AS 102 to SP 128. The challenge is then 'solved' by SP 128, and the response transmitted 316 from SP 128 to AS 102 and then transmitted 318 from AS 102 to D 116, which verifies the response. As will be appreciated by persons skilled in the art of computer security, the challenge and response may take a number of different forms, based upon the SP 128 public/private key pair ($K_{SP}$, $K^{-1}_{SP}$). By way of example, two forms of challenge/response involve generation of a one-time large random number (i.e. a nonce) by D 116. In a first approach, the nonce is transmitted to SP 128 via AS 102, where a corresponding digital signature of the nonce is generated using the private key $K^{-1}_{SP}$. The signature is transmitted back to D 116 via AS 102, where it can be verified using the corresponding public key $K_{SP}$. In a second approach, D 116 encrypts the nonce using $K_{SP}$ and transmits the encrypted nonce to SP 128 via AS 102. The identify of SP 128 can thus be confirmed by its ability to decrypt the nonce, which requires $K^{-1}_{SP}$, which is then transmitted back to D 116 via AS 102.

A confirmation of a successful response is transmitted 320 by D 116 to AS 102, which then transmits 322 the DevID, and D 116 public key ($K_{dev}$) to SP 128, thus completing the information about D 116 held by SP 128. A subsequent sequence of transmissions 324, 326, 328, 330 comprise a challenge and response whereby SP 128 confirms that the other party to the enrolment process is actually D 116. Specifically, the challenge is transmitted 324 from SP 128 to AS 102, and then transmitted 326 from AS 102 to D 116. The challenge is then 'solved' by D 116, and the response transmitted 328 from D 116 to AS 102 and then transmitted 330 from AS 102 to SP 128, which verifies the response. Suitable forms for the challenge/response are as discussed previously in relation to the verification of SP 128 by D 116. A confirmation of a successful response is transmitted 332 by SP 128 to AS 102, which is then able to transmit 334 a corresponding confirmation back to D 116. At this point, mutual trust has been established between SP 128 and D 116.

Figure 4:
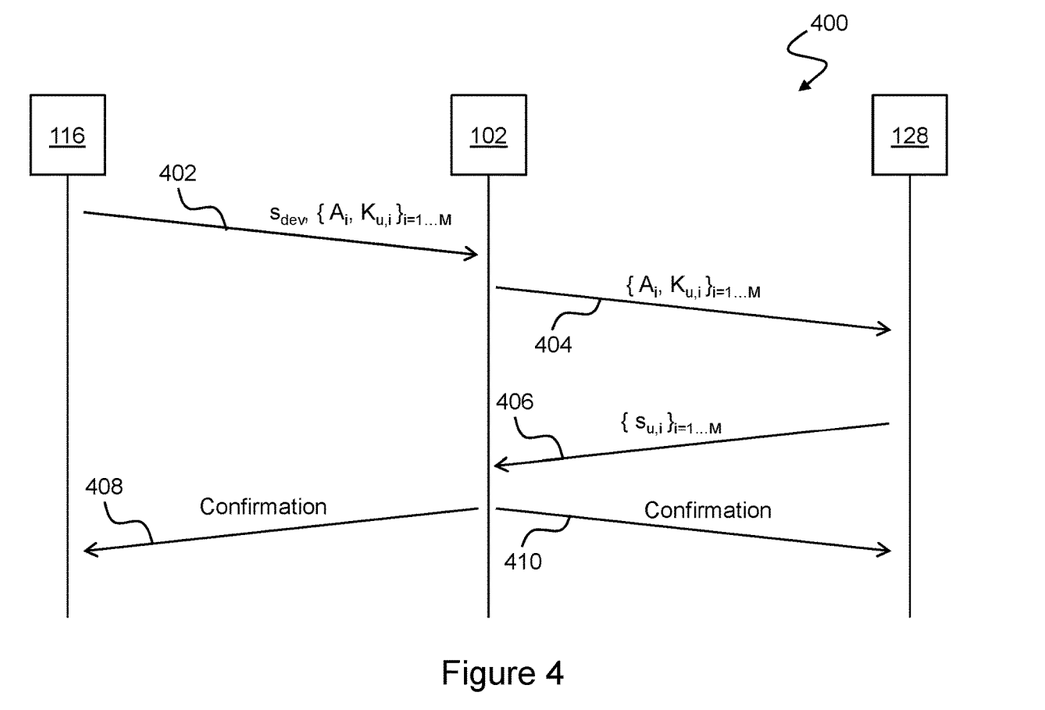
FIG. 4 is a sequence diagram illustrating a second phase of the enrolment process embodying the invention.

FIG. 4 is a sequence diagram 400 illustrating a second phase of the enrolment process embodying the invention, whereby a set of trust credentials are established that can be used for subsequent mutual authentication between SP 128 and D 116. In the description of this process, the following notation is employed:

Sig($K^{-1}$, [m]) is a cryptographic signature function corresponding with message m generated using a private key $K^{-1}$. This function may include first computing one or more hashes of m using a predetermined hash function, such as SHA-256 or SHA-512, which has the advantage of fixing the length of the hashed message to be signed, resulting in a fixed-length signature. The resulting cryptographic signature can be verified given knowledge of the message (which may itself be transmitted along with the signature, or reconstructed from its component parts) and of the corresponding public key K.

[a|b|c| . . . |z] is a message comprising a simple concatenation of component parts a, b, c through z. In this context, the order and formatting of the component parts is significant, because verification of a signature of the message requires reconstruction of an identical message. At the same time, the order and formatting of the component parts is arbitrary in the sense that it is necessary only that a sender and receiver agree, and not that they are chosen in any particular way. The following description is therefore not intended to impose or suggest any particular ordering or format for concatenation in embodiments of the invention.

Using this notation, the algorithm/protocol illustrated in the sequence diagram 400 can be specified as follows.

(a) D (116) generates M user public/private key pairs $\{K_{u,i}, K^{-1}_{u,i}\}_{i=1 \ldots M}$ associated with corresponding authorisation levels $\{A_i\}_{i=1 \ldots M}$;

(b) D (116) computes $s_{dev}$=Sig($K^{-1}_{dev}$, [UID|SPID|DevID|$K_{SP}$]);

(c) D (116) transmits (402) [$s_{dev}$]+[$\{A_i, K_{u,i}\}_{i=1 \ldots M}$] to AS (102);

(d) AS (102) verifies $s_{dev}$ and stores in credentials table (214);

(e) AS (102) transmits (404) [$\{A_i, K_{u,i}\}_{i=1 \ldots M}$] to SP 128;

(f) SP (128) computes $\{s_{u,i}\}_{i=1 \ldots M}$=$\{$Sig($K^{-1}_{SP}$,[UID|SPID|DevID|$A_i$|$K_{u,i}$])$\}_{i=1 \ldots M}$;

(g) SP (128) transmits (406) [$\{(s_{u,i}\}_{i=1 \ldots M}$] to AS (102);

(h) AS (102) verifies $\{s_{u,i}\}_{i=1 \ldots M}$ and stores in credentials table (214);

(i) AS (102) confirms (408, 410) credentials to D (116) and SP (128).

Figure 5:
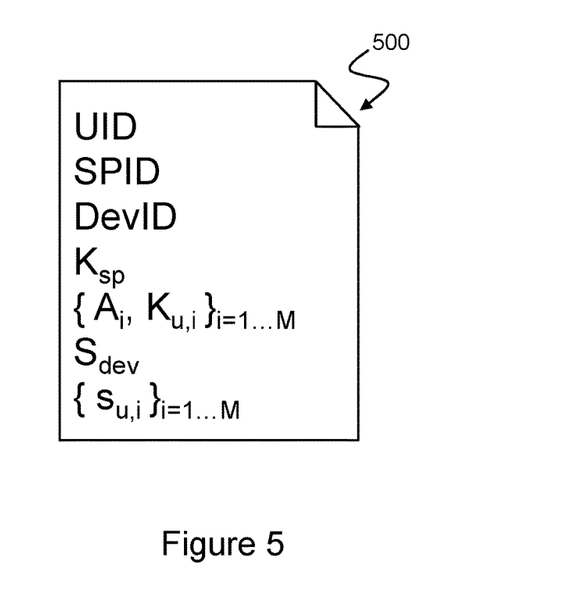
FIG. 5 is a schematic diagram of an exemplary trust credentials document embodying the invention.

Following completion of this sequence, it is possible to construct a trust credentials document 500, an exemplary version of which is illustrated schematically in FIG. 5. This document 500 comprises the UID, DevID and SPID that define the enrolment relationship between the user 142, the user device 116 and the service provider system 128, along with the associated public keys and authorisation levels ($K_{SP}$, $\{A_i, K_{u,i}\}_{i=1 \ldots M}$) and the cryptographic signatures $s_{dev}$ and $\{s_{u,i}\}_{i=1 \ldots M}$.

Figure 6:
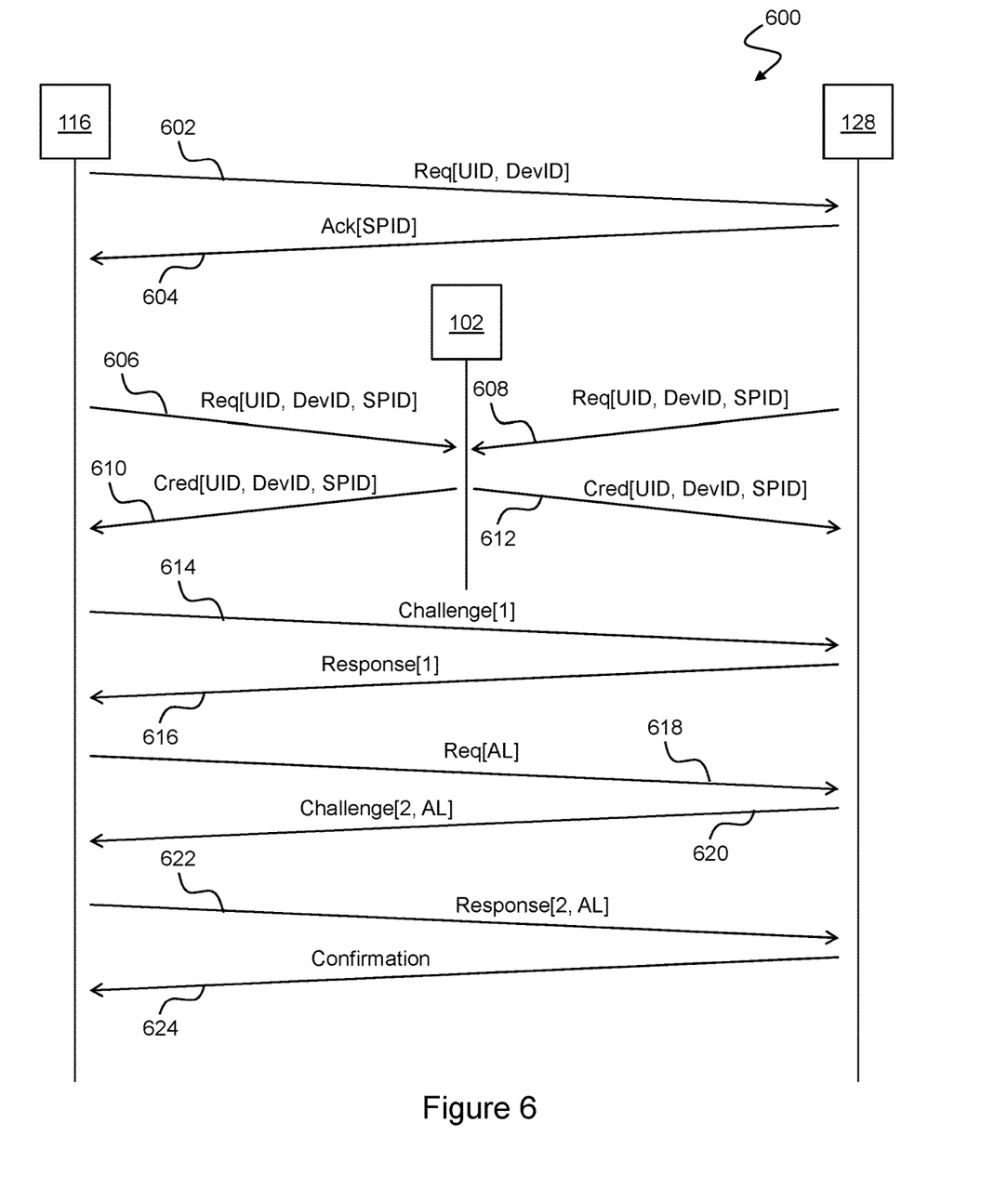
FIG. 6 is a sequence diagram illustrating an exemplary mutual authentication process based on the trust credentials document of FIG. 5.

FIG. 6 is a sequence diagram 600 illustrating an exemplary mutual authentication process between SP 128 and D 116 using a trust credentials document retrieved from AS 102. In this example, D 116 initiates the sequence by transmitting 602 its DevID and the relevant UID for the user 142 to SP 128, which responds by transmitting its SPID. At this point, both D 116 and SP 128 possess the unique (UID, DevID, SPID) tuple defining the enrolment relationship, and are able to transmit 606, 608 this tuple to AS 102 in a request to retrieve the trust credentials document 600. In response, AS 102 constructs the document from the corresponding data in the database 200, and transmits 610, 612 copies to both D 116 and SP 128.

The integrity of the trust credentials document 500 can then be verified by D 116 and SP 128, which use the UID, DevID, SPID, public keys and authorisation levels ($K_{SP}$, $\{A_i, K_{u,i}\}_{i=1 \ldots M}$) to recompute the cryptographic signatures $s_{dev}$ and $\{s_{u,i}\}_{i=1 \ldots M}$ using their respective private keys ($K^{-1}_{dev}$, $K^{-1}_{SP}$) and compare with the versions in the document 500. If any part of the document 500 contents has been altered or falsified, this verification will fail at one or both of D 116 and SP 128. Otherwise, both D 116 and SP 128 are assured that they are each in possession of the other party's relevant public key(s). However, at this stage neither can be certain that the other party has successfully verified its part of the document 500, or that it is the original authentic entity.

Accordingly, a subsequent sequence of transmissions 614, 616 comprise a challenge and response whereby D 116 confirms that the other party to the authentication process is actually SP 128. Specifically, the challenge is transmitted 614 from D 116 to SP 128. The challenge is then 'solved' by SP 128, and the response transmitted 616 from SP 128 to D 116, which verifies the response. Suitable forms for the challenge/response, which are based upon the SP 128 key pair ($K_{SP}$, $K^{-1}_{SP}$), may be as discussed previously with reference to FIG. 3 in relation to the verification of SP 128 by D 116.

Subsequently, D 116 transmits 618 to SP 128 a request for reverse authentication, specifying a required authentication level AL (assuming an implementation in which multiple authentication levels are provided). A sequence of transmissions 620, 622 comprise a challenge and response whereby SP 128 confirms that the other party to the authentication process is actually D 116. Specifically, the challenge is transmitted 620 from SP 128 to D 116. The challenge is then 'solved' by D 116, and the response transmitted 622 from D 116 to SP 128, which verifies the response. Suitable forms for the challenge/response, which are based upon the relevant authentication level key pair ($K_{u,AL}$, $K^{-1}_{u,AL}$), may be as discussed previously with reference to FIG. 3 in relation to the verification of SP 128 by D 116. SP 128 informs D 16 of successful verification via a confirmation transmission 624. This completes the mutual authentication between D 116 and SP 128, which are then able to proceed with subsequent transactions.

From the foregoing description, it will be understood that embodiments of the invention provide for mutual authentication between an agent, such as a user, and a service host, such as a service provider system, via an insecure and/or untrusted communications network. In exemplary embodiments, an initial enrolment sequence 300, 400, which is mediated by an authentication server 102, establishes an association between a service host system 128 having an identifier SPID, an agent (e.g. user 142) that is assigned an agent identifier UID known to the service provider, and a client device 116 having a device identifier DevID, which is used to access the service, along with a set of credentials comprising cryptographic signatures generated by the service host system 128 and client device 116 using corresponding private keys. The resulting data and credentials remain valid so long as the private keys are not compromised, and can be used subsequently for mutual authentication between the client device 116 and the service host system 128. In the case of services provided to an end user 142, the required functionality on a user device may be implemented within an app, e.g. an app developed and distributed by the service provider. The app may employ a keystore service provided by the device system software and/or hardware, to ensure security of the device and user private keys. Details of the enrolment and authentication sequences may thereby remain transparent to the user 142, who may be required only to provide local authentication to the app (e.g. via a password, challenge/response, and/or biometric identification such as a fingerprint) to enable it to access the keystore service and initiate authentication.

It will, however, be appreciated that the described embodiments are provided by way of example, for the purpose of teaching the general features and principles of the invention, but should not be understood as limiting the scope of the invention, which is as defined in the appended claims.

The invention claimed is:

1. A cryptographic method for providing mutual authentication between an agent associated with a client device and a service host system, wherein the agent is assigned an agent identifier, the client device is assigned a device identifier, the service host is assigned a service host identifier, the client device has an associated public/private key pair ($K_{dev}$, $K^{-1}_{dev}$), and the service host system has an associated public/private key pair ($K_{SP}$, $K^{-1}_{SP}$), and wherein the method comprises:

receiving, from the client device, a first cryptographic signature of a concatenation of the agent identifier, the device identifier, the service host identifier, and the service host system public key ($K_{SP}$);

verifying, using the client device public key ($K_{dev}$), that the first cryptographic signature was generated using the client device private key ($K^{-1}_{dev}$);

receiving, from the client device, one or more agent public keys ($\{K_{u,i}\}$) generated at the client device and each having a corresponding agent private key ($\{K^{-1}_{u,i}\}$);

transmitting, to the service host system, the one or more agent public keys ($\{K_{u,i}\}$);

receiving, from the service host system, for each of the one or more agent public keys, a corresponding subsequent cryptographic signature of a concatenation of the agent identifier, the device identifier, the service host identifier, and the associated agent public key ($K_{u,i}$); and verifying, using the service host system public key ($K_{SP}$), that each subsequent cryptographic signature was generated using the service host system private key ($K^{-1}_{SP}$), whereby the first cryptographic signature and the one or more subsequent cryptographic signatures comprise public credentials for mutual authentication between the agent and the service host system.

2. The method of claim 1, wherein the agent comprises a human user, the client device comprises a user device, and the service host system comprises a service provider system.

3. The method of claim 1, wherein the one or more agent public keys comprise a plurality of agent public keys, each of which is associated with a corresponding authorisation level.

4. The method of claim 1, further comprising authentication of the service host system at the client device using the first cryptographic signature by steps comprising:

verifying, by the client device using the using the client device private key ($K^{-1}_{dev}$), that the first cryptographic signature corresponds with the agent identifier, the device identifier, the service host identifier, and the service host system public key ($K_{SP}$);

generating, by the client device, a first challenge requiring solution by the service host system using the service host system private key ($K^{-1}_{SP}$);

transmitting, by the client device to the service host system, a message comprising the first challenge;

generating, by the service host system using the service host system private key ($K^{-1}_{SP}$), a response to the first challenge;

transmitting, by the service host system to the client device, a message comprising the response to the first challenge; and verifying, by the client device using the service host system public key ($K_{SP}$), that the response to the first challenge was generated using the service host system private key ($K^{-1}_{SP}$).

5. The method of claim 1, further comprising authentication of the agent at the service host system using a selected one of the subsequent cryptographic signatures by steps comprising:

verifying, by the service host system using the service host system private key ($K^{-1}_{SP}$), that the selected cryptographic signature corresponds with the agent identifier, the device identifier, the service host identifier, and the agent public key ($K_{u,i}$) associated with the selected cryptographic signature;

generating, by the service host system, a second challenge requiring solution by the client device using the associated agent private key ($K^{-1}_{u,i}$);

transmitting, by the service host system to the client device, a message comprising the second challenge;

generating, by the client device using the associated agent private key ($K^{-1}_{u,i}$), a response to the second challenge;

transmitting, by the client device to the service host system, a message comprising the response to the second challenge; and verifying, by the service host system using the corresponding agent public key ($K_{u,i}$), that the response to the second challenge was generated using the associated agent private key ($K^{-1}_{u,i}$).

6. The method of claim 1, further comprising initial enrolment of the agent to access one or more services of the service host system by steps comprising:

receiving, from the service host system, the agent identifier;

generating a session-specific identifier suitable for communication by the service host system to the client device;

transmitting, to the service host system, the session-specific identifier;

receiving, from the client device, the session-specific identifier and the device identifier;

transmitting, to the client device, the service host public key ($K_{SP}$);

transmitting, to the service host system, the client device public key ($K_{dev}$);

receiving, from the client device, a message comprising a service host challenge requiring solution by the service host system using the service host system private key ($K^{-1}_{SP}$);

transmitting, to the service host system, a message comprising the service host challenge;

receiving, from the service host system, a message comprising a response to the service host challenge;

transmitting, to the client device, a message comprising the response to the service host challenge, whereby the client device is able to verify the response to the service host challenge using the service host public key ($K_{SP}$);

receiving, from the service host system, a message comprising a client device challenge requiring solution by the client device using the client device private key ($K^{-1}_{dev}$);

transmitting, to the client device, a message comprising the client device challenge;

receiving, from the client device, a message comprising a response to the client device challenge; and transmitting, to the service host system, a message comprising the response to the client device challenge, whereby the service host system is able to verify the response to the client device challenge using the client device public key ($K_{dev}$).

7. An authorisation server configured to provide for mutual authentication between an agent associated with a client device and a service host system, wherein the agent is assigned an agent identifier, the client device is assigned a device identifier, the service host is assigned a service host identifier, the client device has an associated public/private key pair ($K_{dev}$, $K^{-1}_{dev}$), and the service host system has an associated public/private key pair ($K_{SP}$, $K^{-1}_{SP}$), the authorisation server comprising:

a processor;

at least one memory device accessible by the processor; and a network interface accessible by the processor, wherein the at least one memory device contains a body of program instructions which, when executed by the processor, cause the authorisation server to implement a method comprising:

receiving, from the client device via the network interface, a first cryptographic signature of a concatenation of the agent identifier, the device identifier, the service host identifier, and the service host system public key ($K_{SP}$);

verifying, using the client device public key ($K_{dev}$), that the first cryptographic signature was generated using the client device private key ($K^{-1}_{dev}$);

receiving, from the client device via the network interface, one or more agent public keys ($\{K_{u,i}\}$) generated at the client device and each having a corresponding agent private key ($\{K^{-1}_{u,i}\}$);

transmitting, to the service host system via the network interface, the one or more agent public keys ($\{K_{u,i}\}$);

receiving, from the service host system via the network interface, for each of the one or more agent public keys, a corresponding subsequent cryptographic signature of a concatenation of the agent identifier, the device identifier, the service host identifier, and the associated agent public key ($K_{u,i}$); and verifying, using the service host system public key ($K_{SP}$), that each subsequent cryptographic signature was generated using the service host system private key ($K^{-1}_{SP}$), whereby the first cryptographic signature and the one or more subsequent cryptographic signatures comprise public credentials for mutual authentication between the agent and the service host system.

8. The authorisation server of claim 7, wherein the one or more agent public keys comprise a plurality of agent public keys, each of which is associated with a corresponding authorisation level.

9. The authorisation server of claim 7, wherein the body of program instructions, when executed by the processor, further cause the authorisation server to implement a method for initial enrolment of the agent to access one or more services of the service host system by steps comprising:

receiving, from the service host system via the network interface, the agent identifier;

generating a session-specific identifier suitable for communication by the service host system to the client device;

transmitting, to the service host system via the network interface, the session-specific identifier;

receiving, from the client device via the network interface, the session-specific identifier and the device identifier;
transmitting, to the client device via the network interface, the service host public key ($K_{SP}$);
transmitting, to the service host system via the network interface, the client device public key ($K_{dev}$);
receiving, from the client device via the network interface, a message comprising a service host challenge requiring solution by the service host system using the service host system private key ($K^{-1}_{SP}$);
transmitting, to the service host system via the network interface, a message comprising the service host challenge;
receiving, from the service host system via the network interface, a message comprising a response to the service host challenge;
transmitting, to the client device via the network interface, a message comprising the response to the service host challenge, whereby the client device is able to verify the response to the service host challenge using the service host public key ($K_{SP}$);
receiving, from the service host system via the network interface, a message comprising a client device challenge requiring solution by the client device using the client device private key ($K^{-1}_{dev}$);
transmitting, to the client device via the network interface, a message comprising the client device challenge;
receiving, from the client device via the network interface, a message comprising a response to the client device challenge; and
transmitting, to the service host system via the network interface, a message comprising the response to the client device challenge, whereby the service host system is able to verify the response to the client device challenge using the client device public key ($K_{dev}$).

10. A computer program product for use in providing mutual authentication between an agent associated with a client device and a service host system, wherein the agent is assigned an agent identifier, the client device is assigned a device identifier, the service host is assigned a service host identifier, the client device has an associated public/private key pair ($K_{dev}$, $K^{-1}_{dev}$), and the service host system has an associated public/private key pair ($K_{SP}$, $K^{-1}_{SP}$), the product comprising a tangible computer-readable medium having instructions stored thereon which, when executed by a processor of the client device, implement a method comprising:
generating, using the client device private key ($K^{-1}_{dev}$), a cryptographic signature of a concatenation of the agent identifier, the device identifier, the service host identifier, and the service host system public key ($K_{SP}$);
transmitting, to an authorisation server, the cryptographic signature, whereby the authorisation server is able to verify, using the client device public key ($K_{dev}$), that the cryptographic signature was generated using the client device private key ($K^{-1}_{dev}$);
generating one or more agent public/private key pairs ($\{K_{u,i}, K^{-1}_{u,i}\}$); and
transmitting, to the authorisation server, the one or more agent public keys ($\{K_{u,i}\}$).

11. The computer program product of claim 10, wherein the one or more agent public keys comprise a plurality of agent public keys, each of which is associated with a corresponding authorisation level.

12. The computer program product of claim 10, wherein in stored instructions, when executed by the processor of the client device, further implement steps for authentication of the service host system at the client device using the cryptographic signature comprising:
verifying, using the client device private key ($K^{-1}_{dev}$), that the cryptographic signature corresponds with the agent identifier, the device identifier, the service host identifier, and the service host system public key ($K_{SP}$);
generating a challenge requiring solution by the service host system using the service host system private key ($K^{-1}_{SP}$);
transmitting, to the service host system, a message comprising the challenge, whereby the service host system is able to use the service host system private key ($K^{-1}_{SP}$) to generate a response to the challenge;
receiving, from the service host system, a message comprising the response to the challenge; and
verifying, using the service host system public key ($K_{SP}$), that the response to the challenge was generated using the service host system private key ($K^{-1}_{SP}$).

13. A service host system configured to provide for mutual authentication between an agent associated with a client device and the service host system, wherein the agent is assigned an agent identifier, the client device is assigned a device identifier, the service host is assigned a service host identifier, the client device has an associated public/private key pair ($K_{dev}$, $K^{-1}_{dev}$), and the service host system has an associated public/private key pair ($K_{SP}$, $K^{-1}_{SP}$), the service host system comprising:
a processor;
at least one memory device accessible by the processor; and
a network interface accessible by the processor,
wherein the at least one memory device contains a body of program instructions which, when executed by the processor, cause the service host system to implement a method comprising:
receiving, from an authorisation server via the network interface, one or more agent public keys ($\{K_{u,i}\}$) generated at the client device and each having a corresponding agent private key ($\{K^{-1}_{u,i}\}$);
generating, for each of the one or more agent public keys, a corresponding cryptographic signature of a concatenation of the agent identifier, the device identifier, the service host identifier, and the associated agent public key ($K_{u,i}$); and
transmitting, to the authorisation server via the network interface, the cryptographic signatures, whereby the authorisation server is able to verify, using the service host system public key ($K_{SP}$), that each cryptographic signature was generated using the service host system private key ($K^{-1}_{SP}$).

14. The service host system of claim 13, wherein the one or more agent public keys comprise a plurality of agent public keys, each of which is associated with a corresponding authorisation level.

15. The service host system of claim 13, wherein the body of program instructions, when executed by the processor, further cause the service host system to implement steps for authentication of the client device using a selected one of the cryptographic signatures comprising:
verifying, using the service host system private key ($K^{-1}_{SP}$), that the selected cryptographic signature corresponds with the agent identifier, the device identifier, the service host identifier, and the agent public key ($K_{u,i}$) associated with the selected cryptographic signature;

generating a challenge requiring solution by the client device using the associated agent private key ($K^{-1}_{u,i}$);

transmitting, to the client device via the network interface, a message comprising the challenge, whereby the client device is able to generate, using the associated agent private key ($K^{-1}_{u,i}$), a response to the challenge;

receiving, from the client device via the network interface, a message comprising the response to the challenge; and verifying, using the corresponding agent public key ($K_{u,i}$), that the response to the challenge was generated using the associated agent private key ($K^{-1}_{u,i}$).

* * * * *